United States Patent
Miyata et al.

(10) Patent No.: US 10,884,881 B2
(45) Date of Patent: Jan. 5, 2021

(54) SCALE-OUT STORAGE SYSTEM AND CONFIGURATION INFORMATION CONTROL METHOD FOR IMPLEMENTING HIGH-AVAILABILITY, HIGH-SPEED FAILOVER

(71) Applicant: HITACHI, LTD., Tokyo (JP)

(72) Inventors: Hiroaki Miyata, Tokyo (JP); Youji Nakatani, Tokyo (JP); Masaki Muraoka, Tokyo (JP); Atsushi Miyagaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 28 days.

(21) Appl. No.: 16/296,973

(22) Filed: Mar. 8, 2019

(65) Prior Publication Data
US 2020/0019478 A1    Jan. 16, 2020

(30) Foreign Application Priority Data
Jul. 11, 2018  (JP) .................................. 2018-131897

(51) Int. Cl.
*G06F 11/00* (2006.01)
*G06F 11/20* (2006.01)
(Continued)

(52) U.S. Cl.
CPC ...... *G06F 11/2023* (2013.01); *G06F 2201/82* (2013.01); *H04L 41/0659* (2013.01);
(Continued)

(58) Field of Classification Search
CPC ............. H04L 41/0659; H04L 41/0663; H04L 41/0668; H04L 41/0893; H04L 67/1002;
(Continued)

(56) References Cited

U.S. PATENT DOCUMENTS 10,067,843 B1 * 9/2018 Yochai ................ G06F 11/2092
2010/0162036 A1 * 6/2010 Linden .................. G06F 11/181
714/4.11
(Continued)

FOREIGN PATENT DOCUMENTS

JP        2018-500648 A    1/2018

OTHER PUBLICATIONS

Wikipedia's Input/Output historical version published Jul. 8, 2018 https://en.wikipedia.org/w/index.php?title=Input/output&oldid=849386478 (Year: 2018).*

*Primary Examiner* — Joseph O Schell
(74) *Attorney, Agent, or Firm* — Volpe Koenig

(57) ABSTRACT

Proposed is a scale-out-type storage system which implements high-availability, high-speed failover. In a scale-out-type storage system, two or more nodes each comprise a cluster controller, a node controller, a plurality of subcluster processes (subclusters and the like) which are processes which execute I/O processing in their own node, which form a subcluster between processes in their own node, and which are synchronized with work-type (active)/standby-type (passive) corresponding processes in the other nodes, and a nonvolatile data store (SODB). The configuration information of the storage system is held partitioned into global configuration information of the SODB and local configuration information and the like of the subclusters and the like, and thereupon the working-type subcluster is capable of executing I/O processing without accessing the SODB.

8 Claims, 11 Drawing Sheets

(51) Int. Cl.
*H04L 29/08* (2006.01)
*H04L 12/24* (2006.01)

(52) U.S. Cl.
CPC ...... *H04L 41/0893* (2013.01); *H04L 67/1002* (2013.01); *H04L 67/1095* (2013.01); *H04L 67/1097* (2013.01)

(58) Field of Classification Search
CPC ............ H04L 67/1034; H04L 67/1095; H04L 67/1097; G06F 11/2023; G06F 11/2094; G06F 11/2097; G06F 2201/82; G06F 3/067; G06F 3/0632; G06F 3/0685
See application file for complete search history.

(56) References Cited

U.S. PATENT DOCUMENTS

| | | | |
|---|---|---|---|
| 2011/0106774 A1* | 5/2011 | Wickremesinghe | ........................ H04L 41/0856 707/695 |
| 2011/0213753 A1* | 9/2011 | Manmohan | ......... G06F 11/2023 707/640 |
| 2011/0225095 A1* | 9/2011 | Gawali | ............... G06F 11/2023 705/300 |
| 2014/0325182 A1* | 10/2014 | Varakur | .............. G06F 11/0709 712/30 |
| 2016/0140003 A1 | 5/2016 | Panara et al. | |

* cited by examiner

FIG.10
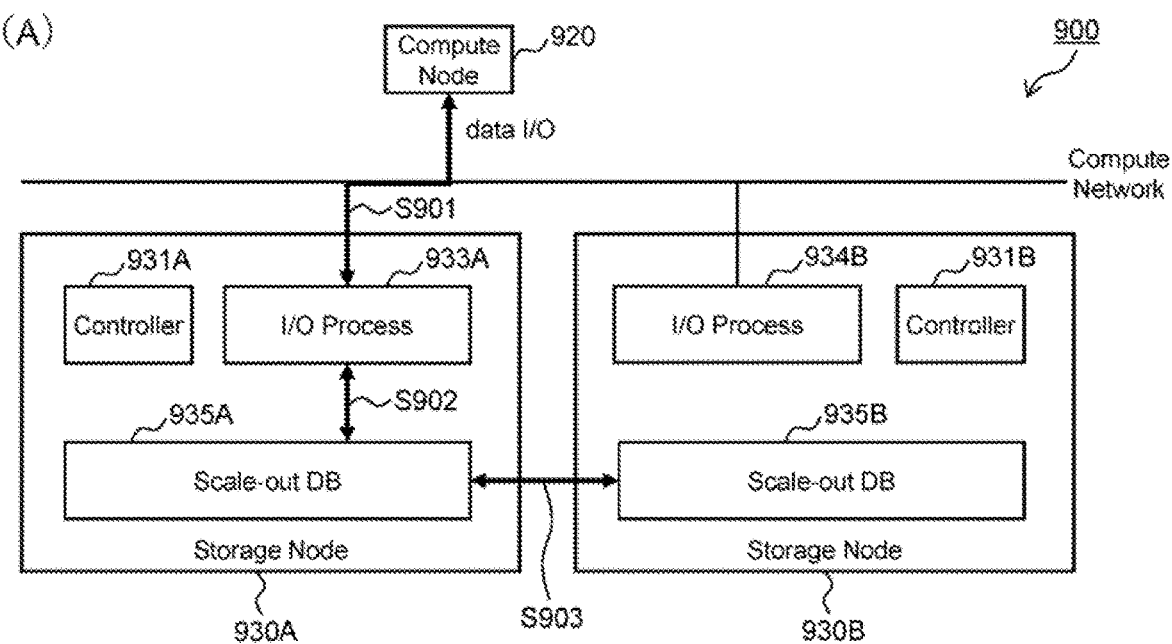
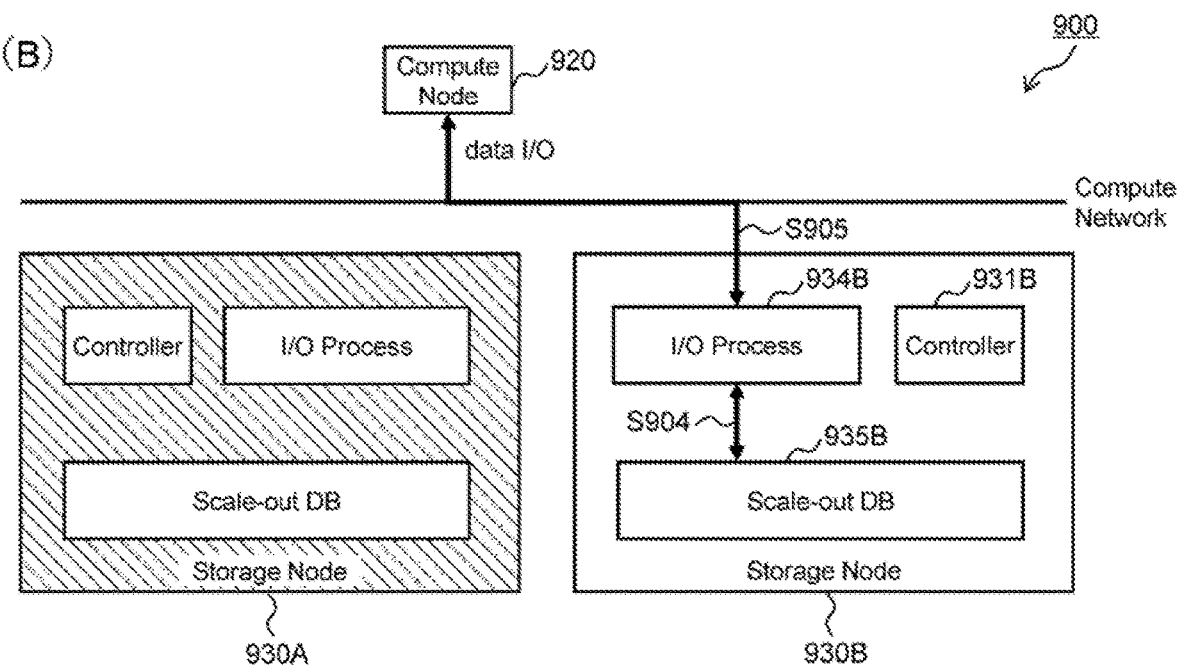

SCALE-OUT STORAGE SYSTEM AND CONFIGURATION INFORMATION CONTROL METHOD FOR IMPLEMENTING HIGH-AVAILABILITY, HIGH-SPEED FAILOVER

TECHNICAL FIELD

The present invention relates to a storage system and a configuration information control method and is suitably applied to a storage system and configuration information control method which control configuration information in a scale-out-type storage system which is configured by clustering a plurality of nodes.

BACKGROUND ART

In recent years there has been a focus on scale-out-type storage systems obtained by constructing a cluster by linking a plurality of nodes. A scale-out-type storage system enables a plurality of nodes to be linked and managed as one file system and possesses high expandability and manageability because nodes can be added without stopping the system. Furthermore, because a scale-out-type storage system clusters processes for processing I/O between a plurality of nodes, even when a certain node shuts down due to failure or the like, the processing can be inherited by a standby-type process and I/O continuation (failover) can be implemented, and therefore availability is high in comparison with a conventional storage system.

For example, PTL 1 discloses a method of managing nodes in a scale-out-type storage system. Specifically, according to the node management method of PTL 1, high-availability failover is implemented, in a scale-out-type storage system, by constructing an HA pair between two nodes in a cluster, establishing a redundant configuration between the HA pair and the cluster, and, when storage node failure arises or an abnormal termination thereof has occurred, performing failover between the HA.

CITATION LIST

Patent Literature

[PTL 1] Japanese Publication No. 2018/500648

SUMMARY OF THE INVENTION

Problems to be Solved by the Invention

However, in the foregoing conventional scale-out-type storage system, when node configuration information must be acquired such as when executing a failover, it has been necessary to access a nonvolatile data store. More specifically, for example, according to the node management method disclosed in the foregoing PTL 1, the configuration information for each node is stored on a storage array disk (mailbox root disk), and when a failover takes place between a node A and node B which form an HA pair, from node A to node B, node B acquired configuration information by accessing a physical disk of its own storage array.

Here, saving the configuration information in a nonvolatile data store is important from the standpoint of preventing data from being lost. However, it is widely known that the physical disks (for example, HDD and SSD and so forth) which are used as the nonvolatile data store have an extremely low data access speed in comparison with volatile in-memory. Therefore, with conventional technology, when node configuration information must be acquired, the processing time is long since access is made to a low-speed, nonvolatile data store, and there is a risk that an immediate failover, for example, cannot be implemented.

The present invention was devised in view of the foregoing points and an object thereof is to propose a storage system and configuration information control method which enable high availability to be provided and a high-speed failover to be implemented in a scale-out-type storage system.

Means to Solve the Problems

In order to solve this problem, the present invention provides a scale-out-type storage system in which a cluster is constructed by linking a plurality of nodes, at least two or more nodes among the plurality of nodes each comprising a cluster controller which controls processing spanning the whole cluster, a node controller which performs closed processing control on its own node, a plurality of subcluster processes which are processes which execute I/O processing in their own node, which form a subcluster between processes in their own node, and which are synchronized with work-type/standby-type corresponding processes in the other nodes, and a nonvolatile data store which is shared by the whole cluster. In this storage system, the data store holds, as global configuration information, configuration information which includes information that must be shared by the whole cluster among the configuration information of the storage system, the subcluster processes hold, as local configuration information, configuration information which is required for their own subcluster process to operate among the configuration information of the storage system, and the work-type subcluster process is capable of executing the I/O processing without accessing the data store.

Furthermore, in order to solve this problem, the present invention provides the following configuration information control method which controls configuration information of a scale-out-type storage system in which a cluster is constructed by linking a plurality of nodes. Here, at least two or more nodes among the plurality of nodes in the storage system each comprise a cluster controller which controls processing spanning the whole cluster, a node controller which performs closed processing control on its own node, a plurality of subcluster processes which are processes which execute I/O processing in their own node, which form a subcluster between processes in their own node, and which are synchronized with work-type/standby-type corresponding processes in the other nodes, and a nonvolatile data store which is shared by the whole cluster. Furthermore, in this configuration information control method, the data store holds, as global configuration information, configuration information which includes information that must be shared by the whole duster among the configuration information of the storage system, the subcluster processes hold, as local configuration information, configuration information which is required for their own subcluster process to operate among the configuration information of the storage system, and the work-type subcluster process is capable of executing the I/O processing without accessing the data store.

Advantageous Effects of the Invention

According to the present invention, high-availability, high-speed failover can be implemented in a scale-out-type storage system.

BRIEF DESCRIPTION OF DRAWINGS

FIG. 10 is a diagram serving to explain the operation of I/O processing in a scale-out-type storage system according to conventional technology.

DESCRIPTION OF EMBODIMENTS

Figure 1:
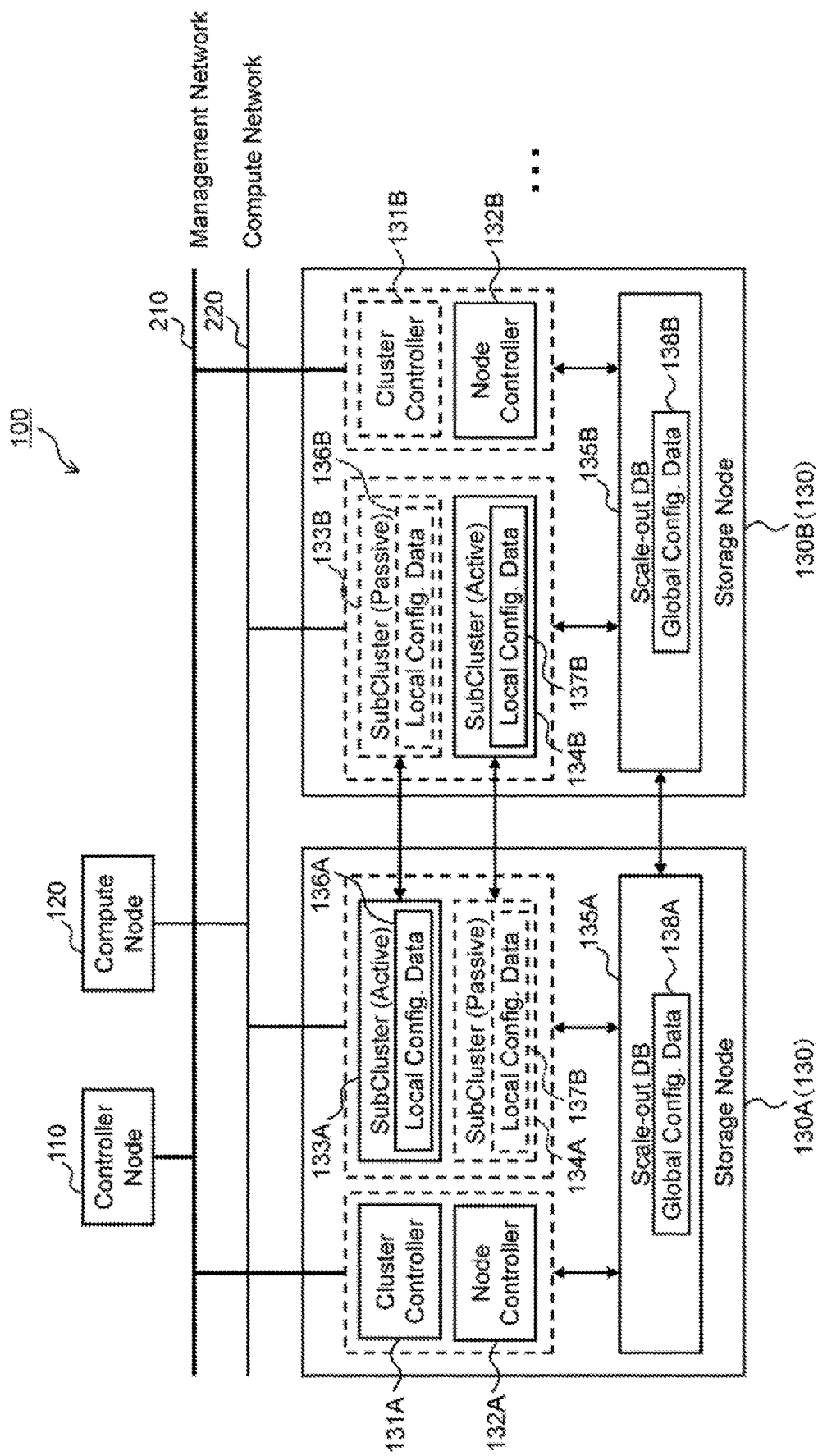
FIG. 1 is a block diagram showing a configuration example of a storage system according to an embodiment of the present invention.

An embodiment of the present invention will be explained in detail hereinbelow with reference to the drawings. Note that there are suffixes such as and so forth which are added after identical numbers in the drawings to distinguish between a plurality of elements with the same function/configuration, however, when these distinctions are not required, suffixes are omitted in notation.

Furthermore, in the description, although the operating statuses of those controllers, services and processes and so forth which are in a working state are labelled as being 'active,' this term is a synonym for 'working type,' 'operating type' or 'active type' and so forth as generally used by a person skilled in the art. Likewise, although elements in a standby state are labelled as 'passive,' these terms are synonyms for 'standby type' and so forth.

(1) Configuration of Scale-Out-Type Storage System.

FIG. 1 is a block diagram showing a configuration example of a storage system according to an embodiment of the present invention. The storage system 100 shown in FIG. 1 is a scale-out-type storage system in which a cluster is constructed by linking a plurality of nodes. Each of the nodes forming the storage system 100 is called a controller node 110, a compute node 120, or a storage node 130, depending on its role.

Note that FIG. 1 shows configurations of important parts which pertain to characteristics of the present invention in the scale-out-type storage system 100 according to the embodiment. Therefore, the storage system 100 according to the embodiment can have configurations other than those shown in FIG. 1. More specifically, for example, the storage system 100 can be configured by comprising a plurality of the foregoing illustrated storage nodes 130 and can have a configuration comprising a server or service (not shown) or the like in each node. Furthermore, the controllers and services and so forth indicated by broken lines in FIG. 1 are denoted as passive (or may not exist or may be replaced).

The controller node 110 is a node which is coupled to a plurality of storage nodes 130 via a management network 210 and which issues storage management operations (for example, a configuration setting request and the like which will be described subsequently). The storage management operations which are issued by the controller node 110 are sent only to a primary cluster master (described subsequently) among the plurality of storage nodes 130.

The compute node 120 is a node which is coupled to the plurality of storage nodes 130 via a compute network 220 and which issues user data processing (I/O). The I/O issued by the compute node 120 are sent to and scattered between all the storage nodes 130.

The storage nodes 130 (individually, the storage nodes 130A, 130B) are nodes which provide storage space in which a plurality of storage nodes 130 are linked via an internode network (not shown) and can be managed as one file system. The plurality of storage nodes 130 are classified according to their role within the cluster configuration, as cluster masters which control monitoring and cooperative operations of the whole storage and cluster slaves which are controlled by the cluster masters. For example, in FIG. 3, which will be explained subsequently, the storage node 130A is a cluster master and the storage node 130B is a cluster slave. The cluster slave performs configuration setting processing for the processes in the node when a configuration setting processing request has been received from the cluster master.

More precisely, the cluster masters can be classified as a primary which operates as an existing service and a secondary which is promoted to a primary when failure has occurred in the primary, as a cluster master standby service. Two or more secondary cluster masters are preferably present for the sake of redundancy. Furthermore, cluster slaves may number 0 or more (that is, may not be present).

Figure 2:
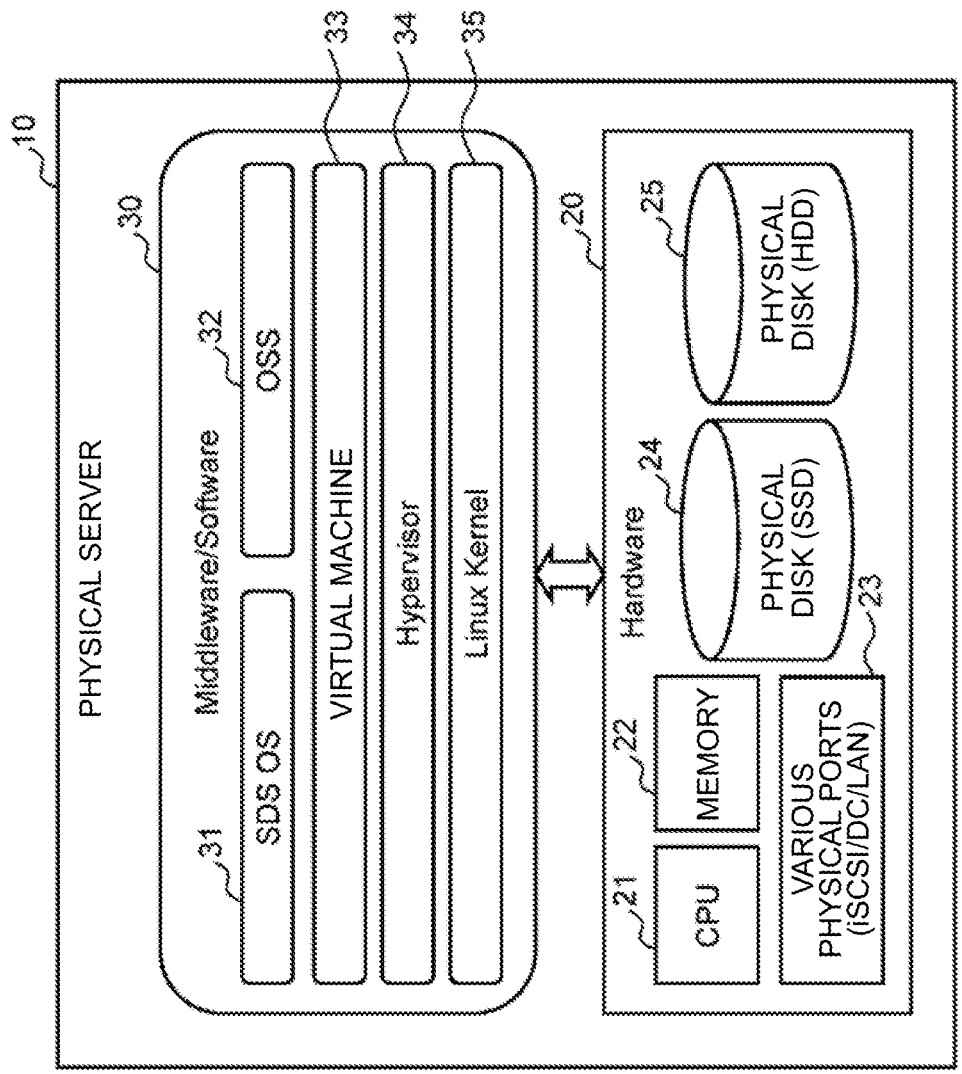
FIG. 2 is a block diagram showing an example of a hardware configuration of each node forming the storage system shown in FIG. 1.

FIG. 2 is a block diagram showing an example of a hardware configuration of each node forming the storage system shown in FIG. 1. As shown in FIG. 2, a node is configured from a generic physical server 10, for example, and comprises, as the configuration of hardware 20, a CPU (Central Processing Unit) 21, a memory 22, various physical ports 23 such as an iSCSI (Internet Small Computer System Interface), FC (Fibre Channel), and LAN (Local Area Network), and physical disks 24, 25 and so forth configured from SSD (Solid State Drives) or HDD (Hard Disk Drives). Furthermore, middleware/software 30 such as an SDS OS (Software-Defined Storage Operating System) 31, OSS (Open Source Software) 32, virtual machine 33, hypervisor 34, and Linux network (Linux Kernel) 35 (Linux: registered trademark) is implemented by this hardware 20.

Note that FIG. 2 shows a generic example of a node hardware configuration, but the present invention is not limited to or by the illustrated configuration, rather, various configurations which are capable of implementing the same functions may be adopted. More specifically, for example, the physical disk may be configured from only either SSD 24 or HDD 25, or may comprise another physical disk. Furthermore, there are also no particular limitations on the numbers of each configuration of the hardware.

Returning to FIG. 1, the internal configurations of the storage nodes 130 will now be explained in detail. As mentioned hereinabove, the internal configuration of the storage nodes 130 shown in FIG. 1 is limited to the configuration of the important parts pertaining to the characteristics of the present invention. Note that, in the ensuing explanation, except when nodes of different classifications are described at the same time, the storage nodes 130 and so on will sometimes appear as 'the nodes 130,' and when individual storage nodes 130A and 130B are referred to, same will be written as the node 130A and node 130B.

As shown in FIG. 1, the storage nodes 130 are configured by comprising a cluster controller 131, a node controller 132, a plurality of subclusters 133, 134, and a scale-out database (SODB) 135.

The cluster controllers 131 (individually, the cluster controller 131A, 131B) are controllers which perform updates to the global configuration information 138 and so forth and control processing which spans the whole cluster. Furthermore, the cluster controller 131 sends a processing request to the node controller 132. Note that the cluster controller 131 is only active in the node 130 of the primary cluster master and is passive in the node 130 of the secondary cluster master. However, when a primary stops and any secondary is promoted to primary, the cluster controller 131 is active in this secondary cluster master.

The node controllers 132 (individually, the node controllers 132A, 132B) perform closed control processing on the node 130 such as updates to the local configuration information 136, 137, and so forth. Furthermore, the node controllers 132 operate by receiving an instruction from the cluster controllers 131.

The cluster controllers 131 and node controllers 132 are control planes and are coupled to the controller node 110 via a management network 210. Note that the control plane in the storage nodes 130 is not limited to the configuration shown in FIG. 1 and may also be housed on a web server or the like, for example.

The subclusters 133, 134 (individually the subclusters 133A, 133B, 134A, 134B) are I/O process services which adopt a subcluster configuration between in-node processes and exist in an unspecified number in the nodes 130. As is also shown in FIG. 1, the subclusters 133, 134 include active processes and passive processes. More specifically, for example, the subcluster 133A is an active process and the subcluster 134A is a passive process.

The plurality of subclusters 133, 134 are data planes and are coupled to the compute node 120 via the compute network 220. The subclusters 133, 134 each store local configuration information (Local Config. Data) 136, 137. In this embodiment, local configuration information is synchronized, in each of the corresponding subclusters, between nodes for which a cluster master and cluster slave relationship has been constructed by means of an internode cluster configuration. More specifically, for example, local configuration information 136A and local configuration information 136B are synchronized between the subcluster 133A of node 130A and the subcluster 133B of node 130B. Note that the data planes in the storage nodes 130 are not limited to the configuration shown in FIG. 1, rather, other I/O processes such as front-end services and back-end services and the like may also be included, for example. Note that, for these other I/O processes, the in-cluster configuration is different for each process.

Note that in the ensuing explanation, when there is no need to distinguish between the subclusters 133 and subclusters 134, that is, when the subclusters are referred to generally, the notation will sometimes be abbreviated to 'subclusters 133.' Likewise, when there is no need to distinguish between the local configuration information 136 and local configuration information 137, that is, when the local configuration information is referred to generally, the notation will sometimes be abbreviated to 'local configuration information 136.'

The SODB 135 (individually, SODB 135A, 135B) are nonvolatile data stores which are coupled to both a control plane and a data plane and which store global configuration information (Global Config. Data) 138. Furthermore, the SODB 135 synchronize the data between the SODB 135 of the other nodes 130 and duplicate the global configuration information 138. Note that the SODB 135 are active only in the cluster master nodes and the cluster slave nodes refer to the SODB 135 in the cluster master nodes. For example, when the SODB 135A in the node 130A is active and the SODB 135B of the node 130B is passive (as described subsequently, even when the SODB 135B is not present), the node 130B refers to the SODB 135A of the node 130A.

Note that, in the storage system 100 according to the embodiment, all the storage nodes (nodes) 130 basically carry the SODB 135. These include a passive SODB 135. However, when all the nodes 130 are made to carry an SODB 135, because the synchronization of information between SODB 135 takes time, the configuration may limit the nodes 130 holding an SODB 135 in order to improve performance. Here, the nodes 130 which do not have an SODB 135 may perform referencing of configuration information for nodes which have an SODB 135.

The internal configurations of the storage nodes 130 were described hereinabove. Among the foregoing internal configurations, the control plane and data plane are implemented, in terms of hardware, by the CPU 21 and memory (in-memory) 22 which are shown in FIG. 2, and the SODB 135 are configured by physical disks 24, 25 such as SSD and HDD. That is, whereas the local configuration information 136 held by the subclusters 133 is stored in an in-memory 22 which has a high data access speed, the global configuration information 138 held by the SODB 135 is stored on physical disks 24, 25 which have a low data access speed.

Here, a few of the words used in the explanation above will be explained further.

First, in this explanation, cluster (main cluster) signifies a cluster which is configured from a plurality of nodes which the storage system 100 comprises. However, subcluster signifies a cluster which is configured between processes and services in individual storage nodes 130 and is a cluster which is internal to the main cluster. The subclusters 133, 134 are such subcluster processes.

Next, in this description, both the global configuration information 138 and the local configuration information 136 signify metadata (configuration information) which indicates the configuration of the storage system 100. One characteristic of the scale-out-type storage system 100 according to the embodiment is that this configuration information is held partitioned as global and local.

Among the foregoing configuration information which is held in the storage system 100 is configuration information which must be shared by the whole main cluster and which is contained in the global configuration information 138. Corresponding examples are information which relates to the configuration of the whole main cluster and information of each node 130 which needs to be inherited by another node 130 when a node 130 fails, and so forth.

Meanwhile, the local configuration information 136 contains configuration information which is only used by processes of the subclusters 133 (in other words, information which is required for the subclusters 133 to operate). A corresponding example is the information required for the subclusters 133 to perform I/O processing, and the like.

However, the global configuration information 138 and local configuration information 136 are not completely independent information and the local configuration information 136 also includes information which is tied to the global configuration information 138. Therefore, to maintain consistency between the configuration information, when there has been a modification to the local configuration information 136, the global configuration information 138 also needs to be changed. Furthermore, when there has been a change to the global configuration information 138, the local configuration information 136 which holds changed content configuration information must be changed. Modification of the configuration information will be described subsequently as configuration information update processing.

(2) Node Function Configuration and Configuration Information

Next, the configuration information held by the nodes (storage nodes) 130 and function configurations relating to the configuration information will be described in more detail.

Figure 3:
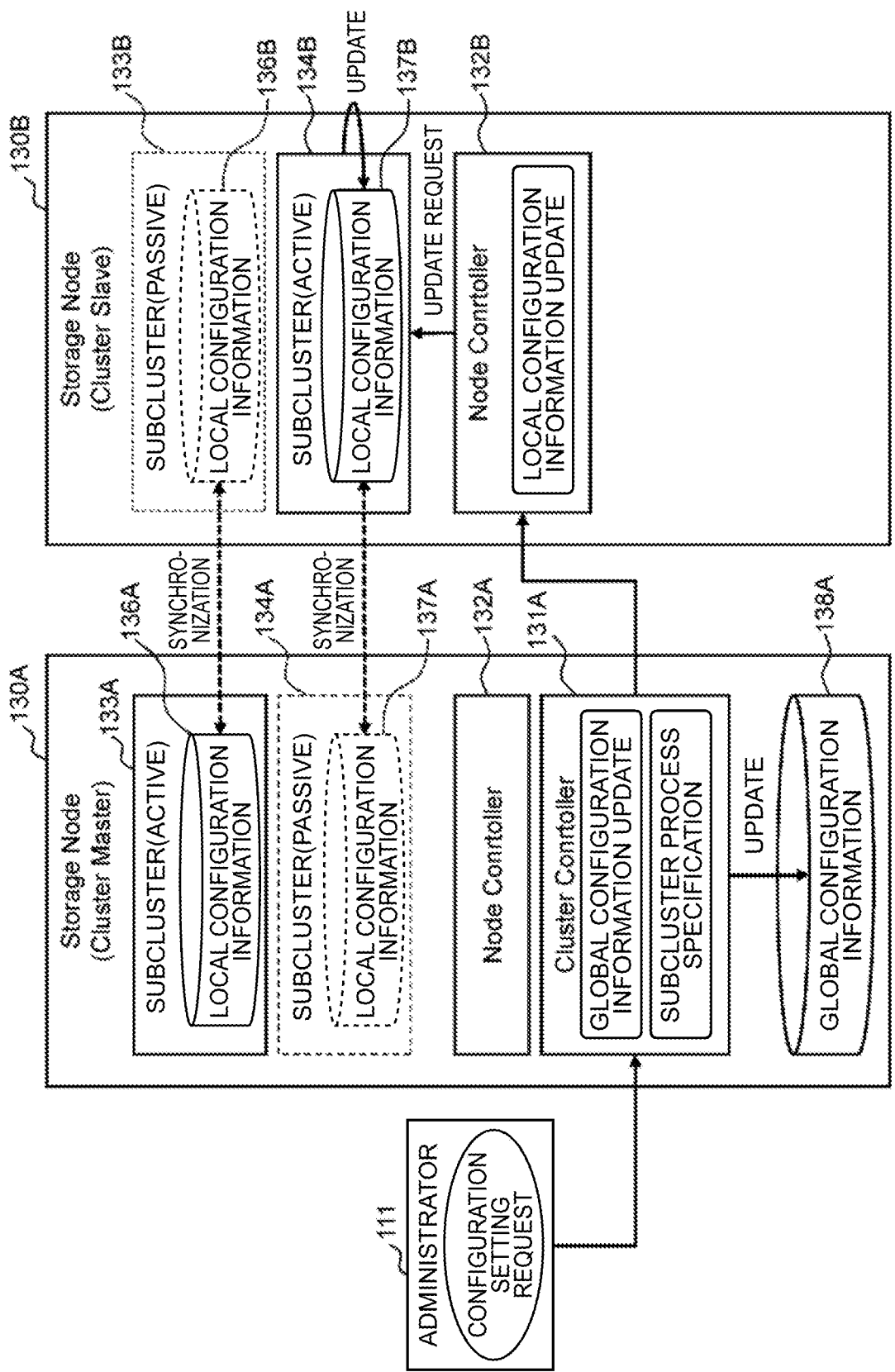
FIG. 3 is a diagram showing a node function block relating to configuration information.

FIG. 3 is a diagram showing node function blocks relating to the configuration information. The storage node (cluster master) 130A and storage node (cluster slave) 130B which are shown in FIG. 3 correspond to the storage nodes 130A, 130B respectively shown in FIG. 1. Furthermore, FIG. 3 shows the flow of processing (configuration information update processing) when a configuration setting request has been issued through an operation by the administrator 111 by means of solid or broken lines with arrows, but this flow corresponds to an explanation regarding configuration information update processing which will be described subsequently with reference to FIG. 6 and so on.

In the relationship between the cluster master 130A and cluster slave 130B, the cluster controller 131A of the cluster master 130A accepts instructions from the controller node 110 (a configuration setting request through an operation of the administrator 111, for example). Although omitted from the illustration in FIG. 3, the cluster controller of the cluster slave 130B is Passive.

Likewise, in the relationship between the cluster master 130A and cluster slave 130B, as global configuration information, global configuration information 138A which is stored in the SODB of the cluster master is referenced. Note that although omitted from the illustration in FIG. 3, when the cluster slave 130B comprises a passive SODB, for example, global configuration information (for example, global configuration information 138B which is shown in FIG. 1) is stored in this SODB and the global configuration information of the cluster slave is synchronized with the global configuration information of the cluster master (see FIG. 1).

Furthermore, the cluster master 130A and cluster slave 130B have the same subcluster configuration, and any one of the plurality of subclusters 133A, 133B (134A, 134B) which are in a mapping relationship is active while the remaining subcluster is passive. Furthermore, the arrangement is such that the local configuration information which is held is synchronized between subclusters which are in a mapping relationship. More specifically, for example, in FIG. 3, the active subcluster 133A of the cluster master 130A is in a mapping relationship with the passive subcluster 133B of the cluster slave 130B and the local configuration information 136A held by the subcluster 133A is synchronized with the local configuration information 136B held by the subcluster 133B. Likewise, the passive subcluster 134A of the cluster master 130A is in a mapping relationship with the active subcluster 134B of the cluster slave 130B and the local configuration information 137A held by the subcluster 134A is synchronized with the local configuration information 137B held by the subcluster 134B.

The cluster controller 131A comprises a function (global configuration information update) for updating the global configuration information 138A which is stored in its own node SODB (not shown) and a function (subcluster process specification) for specifying the process of the subcluster with the targeted local configuration information in order to update the local configuration information according to the global configuration information update. The global configuration information update corresponds to the processing of step S102 in FIG. 6 which will be described subsequently. Furthermore, the subcluster process specification corresponds to the processing of steps S103 to S104 (FIGS. 7 and 8) in FIG. 6, described subsequently.

Furthermore, the node controllers 132A, 132B have a function (local configuration information update) for issuing a request to the subcluster 133 in its own node to update the local configuration information 136 of the subcluster 133. The local configuration information update corresponds to the processing of steps S106 to S107 in FIG. 6 which will be described subsequently.

Figure 4:
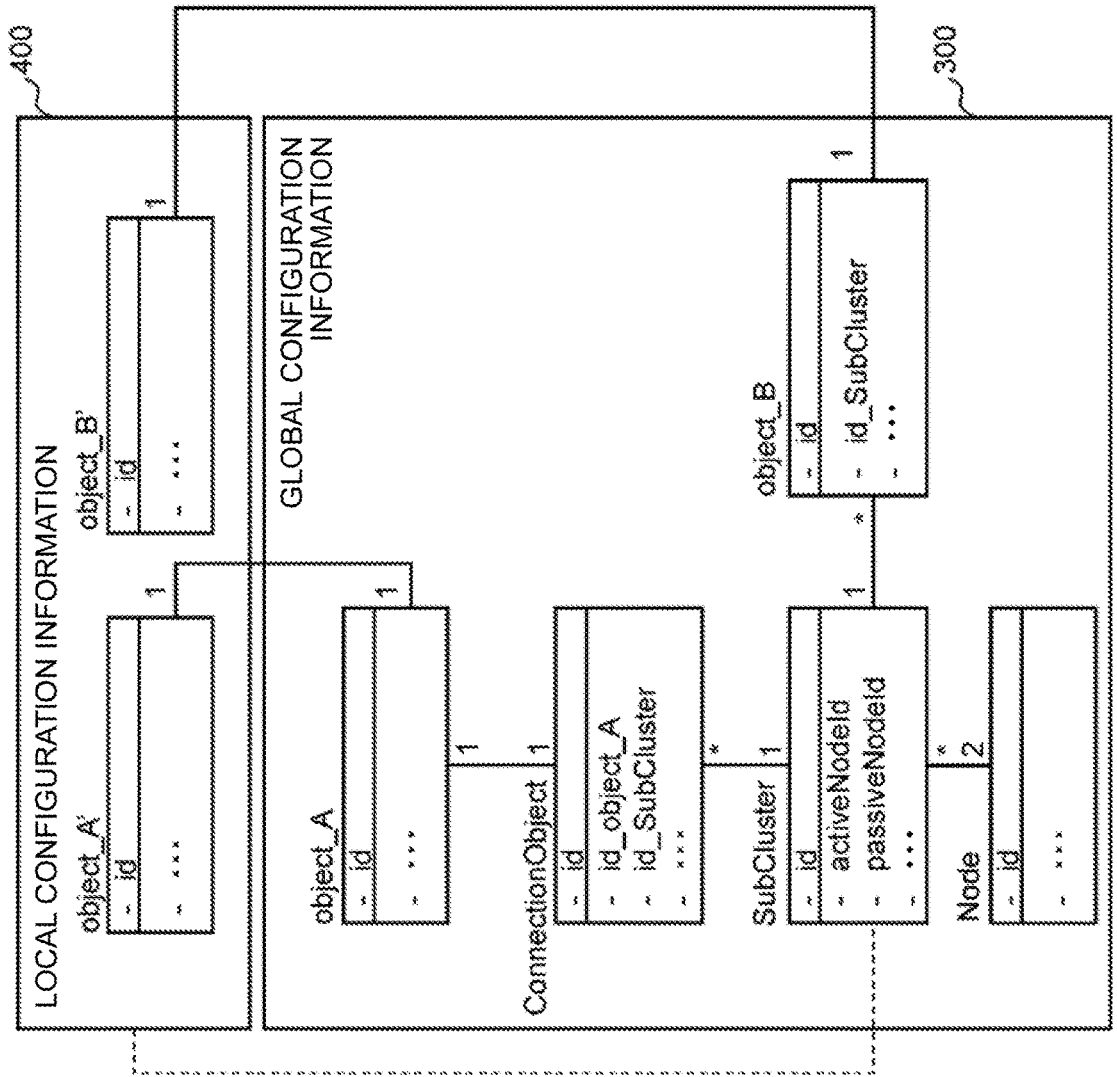
FIG. 4 is an object diagram showing a configuration example of global configuration information and local configuration information.

FIG. 4 is an object diagram showing a configuration example of global configuration information and local configuration information. In FIG. 4, global configuration information 300 is shown as an example which corresponds to the global configuration information 138 shown in FIGS. 1 and 3, and local configuration information 400 is shown as an example which corresponds to the local configuration information 136, 137 shown in FIGS. 1 and 3.

As indicated by the broken lines in FIG. 4, the global configuration information 300 which shows the subcluster configuration information is tied to the local configuration information 400 held in the subcluster. Furthermore, the individual configuration information items ('object_A' and 'object_B' in FIG. 4) which are included in the global configuration information 300 are associated with the individual configuration information items ('object_A'' and 'object_B'' in FIG. 4) respectively which are included in the local configuration information 400. More specifically, these associations can be established by managing the global configuration information 300 and local configuration information 400 by using unique identifiers (ID) in the main cluster.

Figure 5:
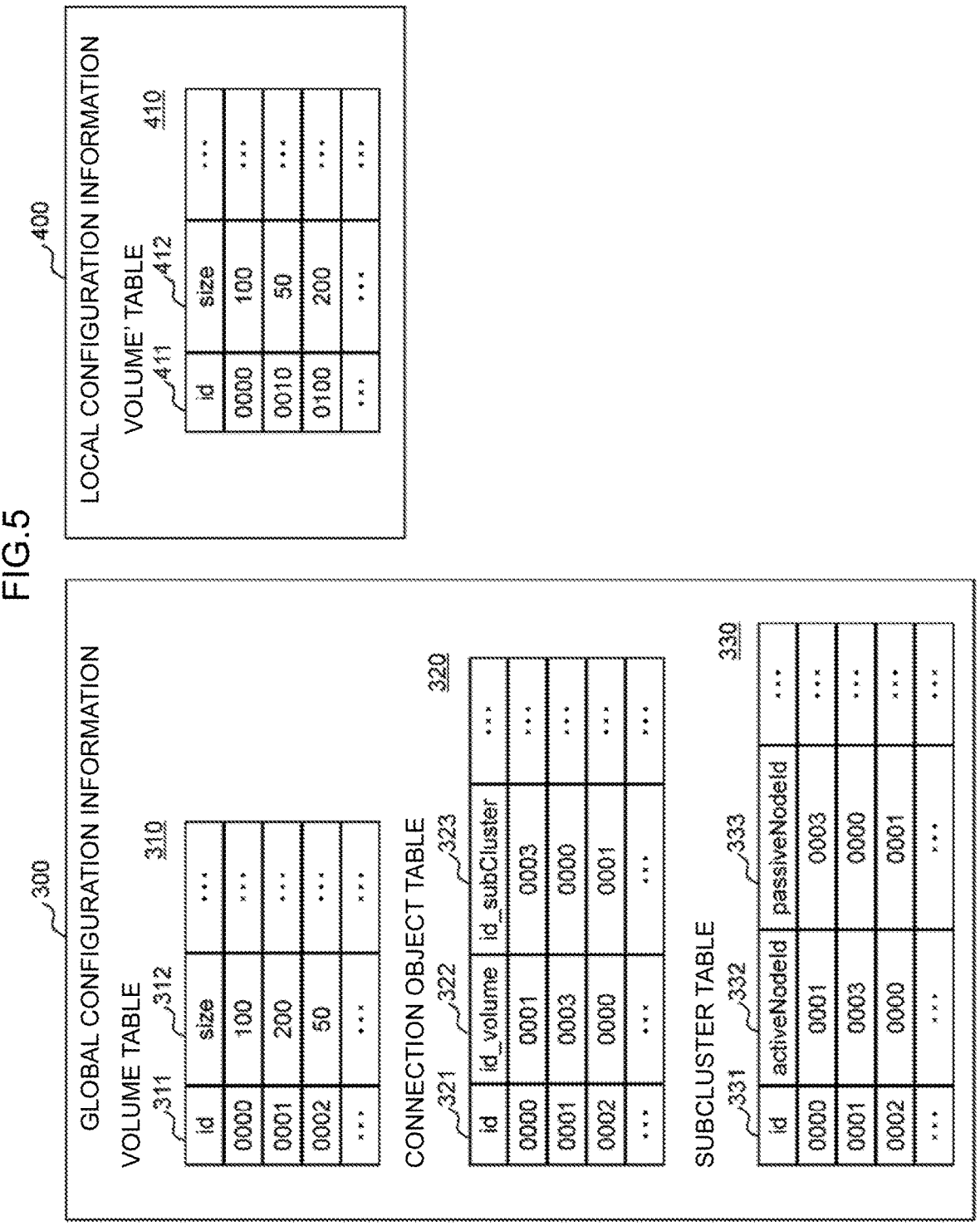
FIG. 5 is a diagram showing a specific example of global configuration information and local configuration information.

FIG. 5 is a diagram showing a specific example of global configuration information and local configuration information. FIG. 5 illustrates a specific table (configuration information table) for some of the objects (configuration information) which are included in the global configuration information 300 and local configuration information 400 shown in FIG. 4. Note that in FIG. 5 'object_A' and 'object_A'' which are shown in FIG. 4 have been replaced with the specific examples 'volume' and 'volume'' and the respective configuration information tables (Volume table 310, Volume' table 410) are shown.

The volume table 310 shown in FIG. 5 is a configuration information table of global configuration information 'Volume' which shows the configuration of each volume for a plurality of volumes which are provided to the user as virtual data stores in the storage system 100. In the case of FIG. 5, the volume table 310 is configured by comprising a volume identifier (id) 311 and a volume capacity (size) 312 which is specified by this identifier.

Note that the 'volume identifier (id) 311 in the volume table 310 is an identifier (ID) which makes it possible to uniquely specify each volume in the main cluster and a common identifier is also used for the 'volume identifier (id_volume) 322' of a ConnectionObject table 320 and the 'volume identifier (id) 411' of the Volume' table 410, which will be described subsequently.

The ConnectionObject table 320 is information indicating the coupled relationships between objects. In the case of FIG. 5, the ConnectionObject table 320 is configured by comprising an identifier (id) 321 for records in the table, a volume identifier (id_volume) 322, and a subcluster identifier (id_subCluster) 323. The subcluster identifier (id_subCluster) 323 is an identifier for identifying the subclusters 133, 134 in the main cluster and a common identifier is assigned to subclusters in a synchronous relationship (the subcluster 133A and subcluster 133B, for example).

The subcluster table 330 is information indicating in which node the process of the subcluster is active or passive. In the case of FIG. 5, the subcluster table 330 is configured by comprising a subcluster identifier (id) 331, an identifier (activeNodeId) 332 of the node in which the subcluster specified by the identifier 331 is active, and an identifier (passiveNodeId) 333 of the node in which the subcluster specified by the identifier 331 is passive. An identifier which is common to the 'subcluster identifier (id_subCluster) 323' of the ConnectionObject table 320 is used for the 'subcluster identifier (id) 331' of the subcluster table 330.

The Volume' table 410 is an object 'Volume'' configuration information table of local configuration information which is associated with the object 'Volume' of the global configuration information. In the case of FIG. 5, the volume table 410 is configured by comprising a volume identifier (id) 411 and a volume capacity (size) 412 which is specified by this identifier. The Volume' table 410 manages configuration information which is required for I/O processing in the subcluster holding the Volume' table 410 among the configuration information managed by the Volume table 310.

As explained hereinabove with reference to FIGS. 3 to 5, in the storage system 100 according to the embodiment, the system configuration information is held not only by a global SODB (the global configuration information 300), rather, a portion of same is also held by a local subcluster (local configuration information 400), in a scale-out-type storage system which possesses a subcluster structure. Furthermore, configuration information is mutually associated by using common identifiers in the global configuration information 300 and local configuration information 400. Note that when the configuration information is held partitioned in this manner, when one configuration information item has been updated, the other configuration information item must likewise be updated to maintain consistency.

Note that, in this embodiment, the method of managing by using identifiers which are common to the global configuration information 300 and local configuration information 400 is not limited to or by the format of the configuration information table illustrated in FIG. 5. For example, when the relationship between 'object_B' and 'object_B'' which are shown in FIG. 4 is considered, the global configuration information 'object_B' can be associated with the corresponding local configuration information 'object_B'' without using the configuration information 'ConnectionObject,' which indicates the coupled relationship between the objects, as an intermediary, by assigning an identifier (id_SubCluster) to the structural information 'SubCluster' pertaining to the Active/Passive nodes of the subclusters.

(3) Configuration Information Update

The processing when updating the configuration information which has been held partitioned in the storage system 100 according to the embodiment will be explained in detail hereinbelow. The updating of the configuration information can occur by means of various timing. More specifically, for example, a configuration information update occurs during I/O implementation during normal work or at the time of a failover which accompanies a node malfunction or the like.

First, when the local configuration information 136A which is stored in the subcluster 133A of a certain node 130A is updated, after updating the local configuration information 136A in the subcluster 133A, the global configuration information 138A which is stored in the SODB 135A of the node 130A (or the global configuration information stored in the SODB of the cluster master node) may likewise be updated. Since the nodes are synchronized, the SODB 135A, 135B may update either global configuration information item. Thus, the global configuration information is also updated according to the update of the local configuration information and it is possible to maintain the consistency of the configuration information which is being held partitioned.

Meanwhile, when the global configuration information 138A is updated, 'specific local configuration information' which has update content configuration information must be updated. Here, since a subcluster configuration between in-node processes has been adopted in this embodiment, an unspecified multiplicity of subclusters are present in the system. Furthermore, these subclusters dynamically change between active and passive depending on the system status. Therefore, when the global configuration information 138A is updated, a process of an active subcluster which holds 'specific local configuration information' must be specified from among the unspecified multiplicity of subclusters which hold local configuration information.

A specific explanation will now be provided by using the configuration in FIG. 3. For example, when, in the node 130A, the cluster controller 131A updates the global configuration information 138A, it may be assumed that the configuration information corresponding to the updated content is stored in the local configuration information 137A, 137B (both local configuration information items are the same because of their synchronous relationship). However, because the subcluster 134A holding the local configuration information 137A is passive, the cluster controller 131A is unable to update the local configuration information 137A of the subcluster 134A and, in this case, there is a need to be able to specify the active subcluster 134B holding the local configuration information 137B as the process holding the 'specific local configuration information' which is to be updated.

Therefore, in the storage system 100 according to the embodiment, the foregoing problem can be solved by carrying control information (specifically the 'SubCluster' and 'ConnectionObject' shown in FIGS. 4 and 5) for specifying dynamically changing subclusters, and when the global configuration information is updated, the subcluster holding the corresponding 'specific local configuration information' can be specified and the local configuration information can be updated. These control information items (objects) are able to specify subclusters as a result of being created when creating global configuration information which is associated with subclusters (the 'object_A' and 'object_A'' management method in FIG. 4) or of causing the global configuration information to carry cluster IDs (the 'object_B' and 'object_B'' management method in FIG. 4). Additionally, as long as a subcluster can be specified, it is possible to specify the node for which configuration settings are to be requested from the 'activeNodeId' carried by the subcluster configuration information (SubCluster).

In the storage system 100 according to the embodiment as described above, processing up until the global configuration information is updated and the corresponding local configuration information is updated will be explained in detail hereinbelow as configuration information update processing.

Figure 6:
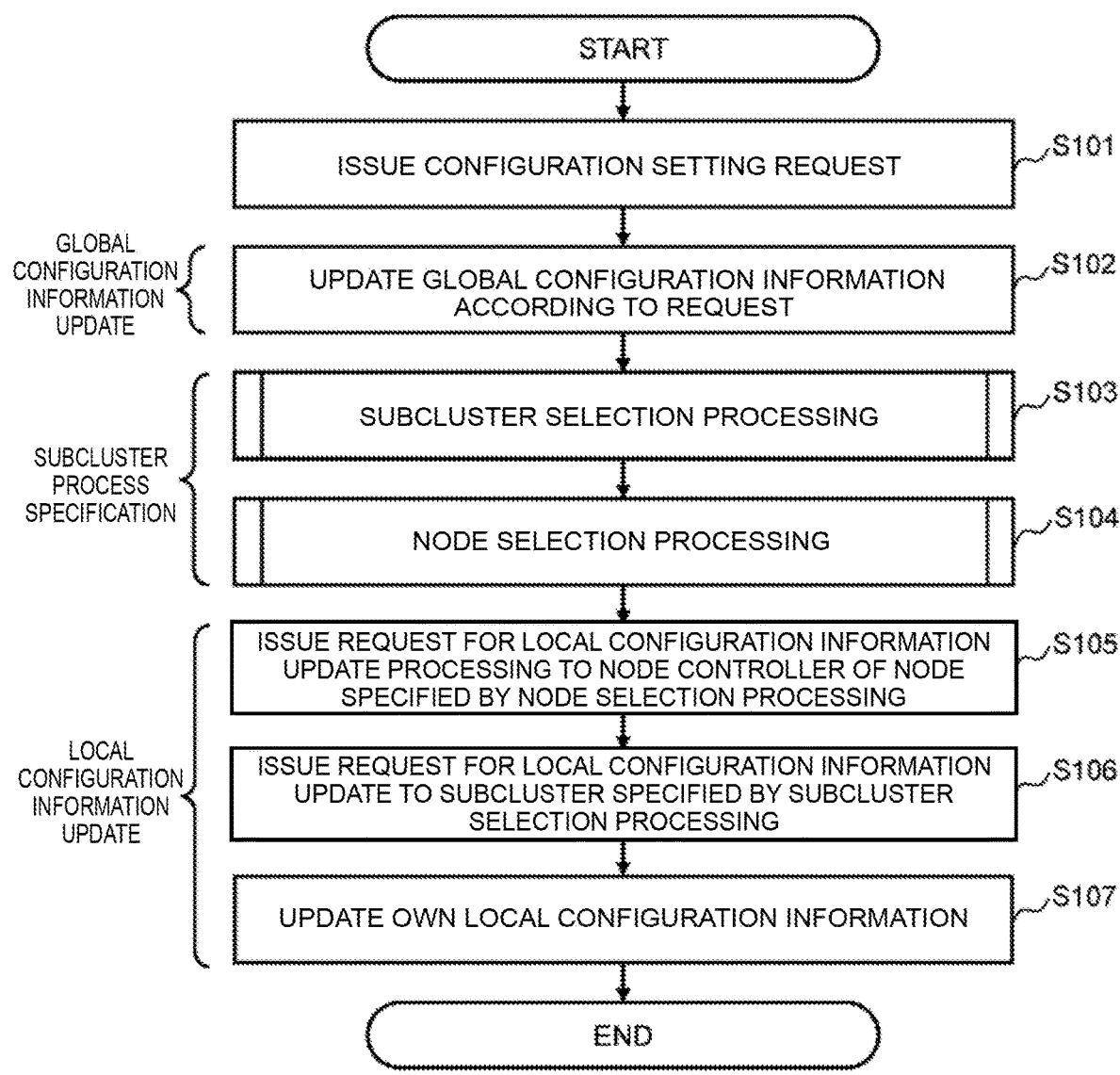
FIG. 6 is a flowchart showing an example of the process steps of configuration information update processing.

FIG. 6 is a flowchart showing an example of process steps of configuration information update processing. FIG. 6 shows, as configuration information update processing, an example of serial process steps when a request (configuration setting request) to modify the configuration settings of global configuration information has been issued, until local configuration information corresponding to the request is updated.

Figure 7:
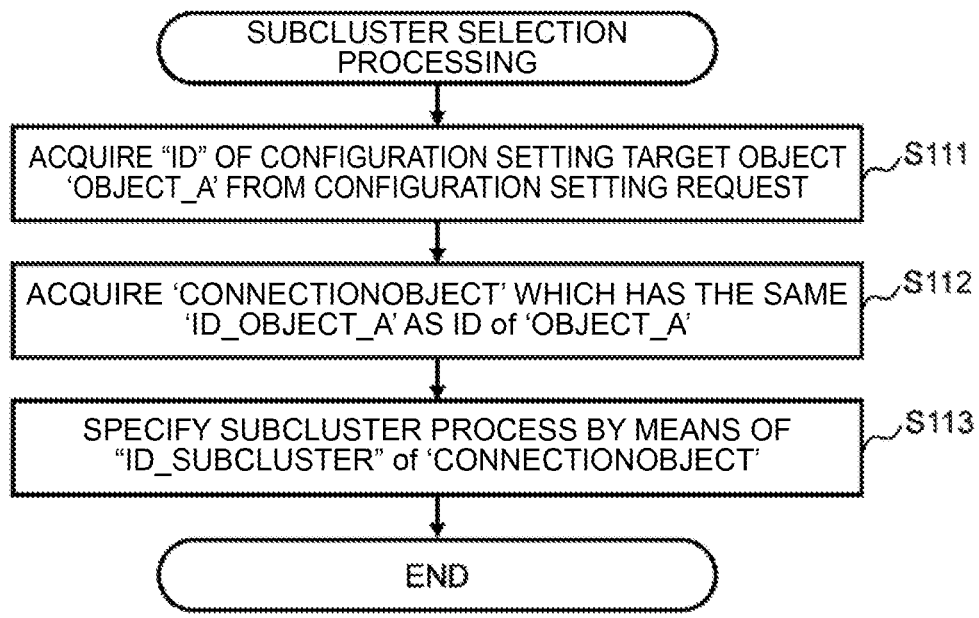
FIG. 7 is a flowchart showing an example of detailed process steps of subcluster selection processing.
Figure 8:
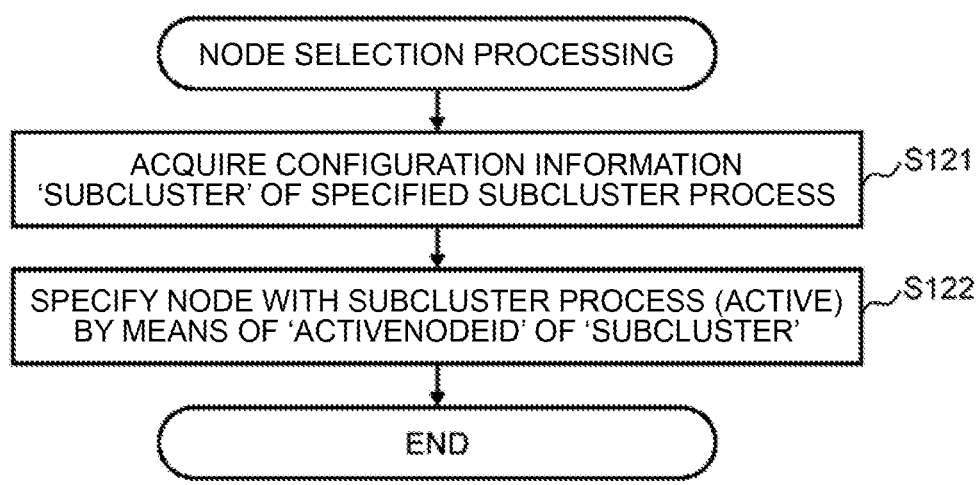
FIG. 8 is a flowchart showing an example of detailed process steps of node selection processing.

Furthermore, FIG. 7 is a flowchart showing an example of the detailed process steps of the subcluster selection processing in step S103 of FIG. 6, and FIG. 8 is a flowchart showing an example of the detailed process steps of the node selection processing in step S104 of FIG. 6.

The process steps of the configuration information update processing shown in FIGS. 6 to 8 will now be explained in detail by using the function configuration and configuration information example shown in FIGS. 3 to 5.

According to FIG. 6, first in step S101, a configuration setting request is issued from the controller node 110. Here, configuration setting denotes a general term for the processing to modify the storage structure. More specifically, corresponding examples are processing to expand/create volumes and pools and processing to delete storage devices, and so forth. The cluster controller 131A of the cluster master 130A receives the configuration setting request thus issued (see FIG. 3).

Note that, in this embodiment, there are no particular limitations on the method of issuing the configuration setting request. For example, the configuration setting target and content can be designated directly by the administrator 111 performing a command input operation. More specifically, for example, when the volume expansion request 510 shown in FIG. 9, described subsequently, is to be issued, a command input such as 'volume expand --id 0000 --size 0200' may be considered. Furthermore, when a predetermined status has occurred in the storage system 100 (for example, when a failover is executed due to node failure and so forth), the target for the configuration information modification and the modification content and the like may be determined and instructed and so forth by means of internal processing.

In the following step S102, the cluster controller 131A of the cluster master 130A which has received the request issued in step S101 updates the global configuration information 138A according to the request.

Thereafter, in step S103, the cluster controller 131A specifies the subcluster (subcluster selection processing) which carries the local configuration information associated with the global configuration information updated in step S102.

Here, the detailed process steps of the subcluster selection processing shown in FIG. 7 will be explained with reference to the object diagram of FIG. 4.

First, in step S111, the cluster controller 131A acquires the identifier (for instance, 'id' of 'object_A') of the configuration setting target object from the configuration setting request issued in step S101.

In subsequent step S112, the cluster controller 131A acquires the object 'ConnectionObject' which has the same identifier 'id object_A' as the identifier ('id' of 'object_A') acquired in step S111.

In subsequent step S113, the cluster controller 131A refers to the 'id_SubCluster' which the object 'ConnectionObject' acquired in step S112 has and specifies the subcluster process.

As a result of the subcluster selection processing of steps S111 to S113 being performed, the cluster controller 131A is able to specify the subcluster holding the local configuration information 'object_A'' which is associated with the configuration information 'object_A' which has been updated by means of a global configuration information update.

Note that the process steps of the subcluster selection processing shown in FIG. 7 is a processing method which follows the object relationship of 'object_A' and 'object_A'' shown in FIG. 4. As also mentioned earlier in the explanation regarding FIG. 4, in this embodiment, the manner in which the global configuration information and local configuration information which are in a mapping relationship are managed by being associated is not limited to or by the foregoing example. Therefore, the detailed process steps of the subcluster selection processing can also be modified according to the association method. More specifically, for example, as per the object relationship between the 'object_B' and 'object_B'' shown in FIG. 4, when the global configuration information and local configuration information which have correspondence therebetween are associated only by means of an identifier 'id_SubCluster' for a 'SubCluster,' it is possible, in subcluster selection processing, to specify the subcluster which holds the local configuration information 'object_B'' which is associated with the configuration information 'object_B' that has been updated by means of the global configuration information update by referring to the 'SubCluster' using the id_SubCluster as the search key without using the 'ConnectionObject' as an intermediary as per the processing of FIG. 7.

Let us now return to FIG. 6. In step S104, the cluster controller 131A uses the configuration information of the subcluster specified in step S103 to specify the node where the active subcluster resides (node selection processing).

Here, the detailed process steps of the node selection processing shown in FIG. 8 will be explained with reference to the object diagram of FIG. 4.

First, in step S121, the cluster controller 131A acquires configuration information 'SubCluster' of the subcluster specified by means of the subcluster selection processing.

Then, in step S122, the cluster controller 131A refers to 'activeNodeId' of the object 'SubCluster' which was acquired in step S121 and specifies the nodes for which the subcluster process is active.

As a result of the node selection processing of steps S121 to S122 being performed, the cluster controller 131A is able to specify the node whose subcluster is active (node 130B in the case of the flow of processing shown in FIG. 3, for example) from among the subclusters holding the local configuration information 'object_A'' which is associated with the configuration setting target object 'object_A.'

Therefore, returning to FIG. 6, in step S105 the cluster controller 131A requests local configuration information update processing from the node controller 132B of the node 130B specified in the node selection processing of step S104.

Then, in step S106, the node controller 132B requests a local configuration information update from the specified active subcluster (subcluster 134B in the case of FIG. 3).

Thereafter, in the following step S107, the subcluster 134B updates its own local configuration information 137B based on the request of step S106. Note that by establishing synchronization between the active subcluster 134B and passive subcluster 134A, the update content of the local configuration information 137B in step S107 is also mirrored by the local configuration information 137A.

As a result of the processing of steps S101 to S107 in FIG. 6 hereinabove, when a configuration setting request has been issued, the storage system 100 is able to update the global configuration information and also update the corresponding local configuration information.

Figure 9:
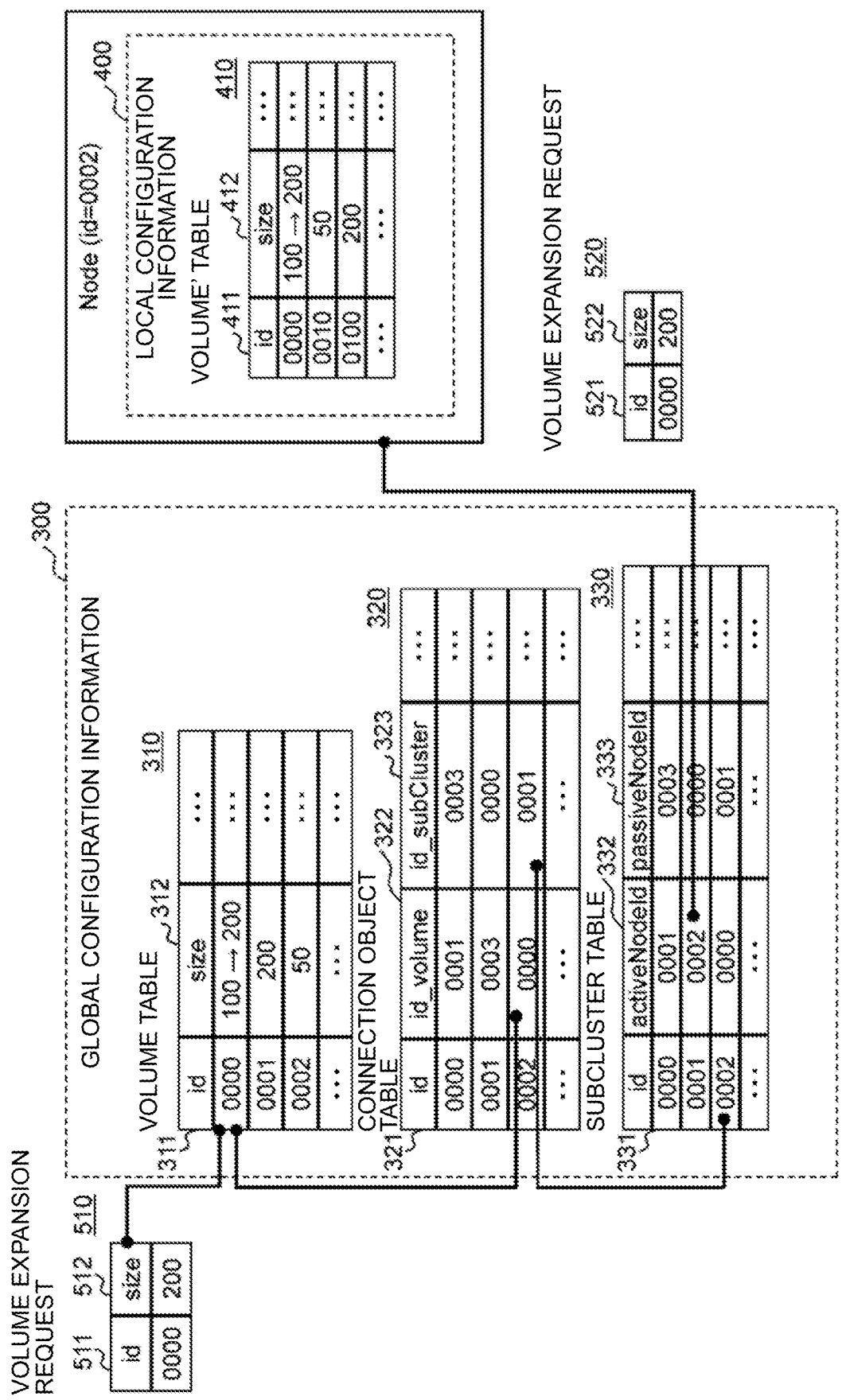
FIG. 9 is a diagram serving to explain the specific flow of configuration information update processing.

FIG. 9 is a diagram serving to explain the specific flow of configuration information update processing. FIG. 9 borrows specific configuration information tables, namely, the global configuration information 300 and local configuration information 400 shown in FIG. 5, and therefore an explanation of the borrowed sections is omitted.

In the example of FIG. 9, it is assumed that when global configuration information (volume) exists, a configuration setting request to expand the 'volume' capacity (volume expansion request 510) has been issued (corresponds to step S101 of FIG. 6). The volume expansion request 510 is configured by comprising an expansion target volume identifier (id) 511 and a post-expansion volume capacity (size) 512, and in this example, a request to expand the capacity to '200' is issued to the volume with the id '0000.'

Note that the volume identifiers (id, id_volume) can be acquired as return values when the volume is created. The target volume designation in the configuration setting request is not limited to designation by means of volume identifiers (id), rather, volumes could also be designated by means of volume names which are set when a volume is created, for example.

The cluster controller 131A which has received the foregoing volume expansion request 510 updates the capacity (size) 312 of the volume whose identifier (id) 311 is '0000' from the previous '100' to '200' in the volume table 310 as per the request content of the volume expansion request 510 (corresponds to step S102 of FIG. 6). As a result, the global configuration information is updated.

Thereafter, the cluster controller 131A acquires the ID '0000' of the volume whose capacity has been updated in the volume table 310, refers to the ConnectionObject table 320, and acquires data with the same ID '0000' as the volume identifier (id_volume) 322 (corresponds to steps S111, S112 of FIG. 7). In this example, the third row of the data rows in the ConnectionObject table 320 is acquired.

The cluster controller 131A then specifies the subcluster identifier (id_subCluster) 323 from the data in the ConnectionObject table 320 thus acquired (corresponds to step S113 of FIG. 7). In this example, '0001' is specified and a subcluster with the identifier '0001' is specified as the subcluster holding the local configuration information which corresponds to the global configuration information updated by the volume expansion request 510.

Thereafter, the cluster controller 131A refers to the subcluster table 330 and acquires data, in the subcluster identifier (id) 331, with the same identifier '0001' as the specified subcluster (corresponds to step S121 of FIG. 8). In this example, the second row of the data rows in the SubCluster table 330 is acquired.

The cluster controller 131A then specifies the active node identifier (activeNodeId) 332 from the data in the SubCluster table 330 thus acquired (corresponds to step S122 of FIG. 8). In this example, '0002' is specified and a node (for example, node 130B) with this identifier '0002' is specified as the node, where the active subcluster resides, which holds the local configuration information which is to be updated to correspond to the global configuration information update.

Thereafter, the cluster controller 131A requests local configuration information update processing from the node controller 132B of the node 130B which has the identifier '0002' specified earlier (corresponds to step S105 of FIG. 6). More specifically, a volume expansion request 520 is sent as shown in FIG. 9. Like the volume expansion request 510, the volume expansion request 520 is configured by comprising an expansion target volume identifier (id) 521 and a post-expansion volume capacity (size) 522, and in this example, a request to expand the capacity to '200' is issued to the volume with the id '0000.'

The node controller 132B which has received this volume expansion request 520 issues an instruction to the active subcluster 134B as per the request content of the volume expansion request 520 and updates the capacity (size) 412 of the volume whose identifier (id) 411 is '0000' from the previous '100' to '200' in the volume' table 410 of the local configuration information 400 (137B) which is stored in the subcluster 134B (corresponds to steps S106, S107 of FIG. 6). As a result, the corresponding local configuration information is updated.

As affirmed hereinabove with reference to FIG. 9, in the storage system 100 according to the embodiment, the local configuration information 400 can be updated after specifying the location of the corresponding local configuration information 400 in response to an update to the global configuration information 300 according to the configuration setting request. As a result, the consistency between the configuration information which is being held partitioned as the global configuration information 300 and local configuration information 400 can be maintained without stopping the normal operation of the storage system 100.

(4) Advantages in I/O Processing and Failover

As explained thus far, the storage system 100 according to the embodiment has a configuration in which a subcluster is formed from processes which perform I/O processing in individual storage nodes of a scale-out-type storage system and in which, among the system configuration information, required configuration information (global configuration information) which must be shared by the whole main cluster is held partitioned in an area common to all nodes (an SODB, for example) and configuration information (local configuration information) which is required for a subcluster to operate is held partitioned in a local subcluster. In addition, when configuration information has been updated as described in detail by the configuration information update processing, consistency between the global configuration information and local configuration information can be maintained.

According to this kind of storage system 100, because I/O processing can be carried out even without accessing an SODB during normal work, an improvement in I/O performance can be expected. Moreover, because I/O configuration information can be acquired without accessing the SODB not just during normal work but even during failover in a case where it has not been possible to use a certain node due to failure occurring or the like, I/O performance can be improved and immediate failover can be implemented. Such characteristics of the storage system 100 according to the embodiment will be explained in detail hereinbelow while being compared with the conventional technology.

First, the conventional technology will be explained. FIG. 10 is a diagram serving to explain an I/O processing operation in a scale-out-type storage system according to conventional technology. FIG. 10A is a diagram explaining operation during normal work and FIG. 10B is a diagram explaining operation at the time of a failover.

A storage system 900 shown in FIGS. 10A and 10B is a scale-out-type storage system according to conventional technology in which a cluster is constructed by linking a plurality of storage nodes 930A, 930B. FIGS. 10A and 10B show a schematic configuration relating to I/O processing in the storage system 900. Like the subclusters 133, 134 in the storage system 100 according to the embodiment, the I/O processes 933A, 934B are processes which perform I/O processing but same are not subclustered as per the embodiment. Furthermore, unlike the embodiment, the partitioned holding of configuration information is not performed by the storage system 900 and configuration information is not held by the I/O processes 933A, 934B. The configuration information is held in an area common to all nodes such as a scale-out database (SODB: Scale-out DB) 935A, 935B. The area common to all nodes is a nonvolatile data store and is typically provided by physical disks, and therefore has an extremely low data access speed (low memory access performance) in comparison with an in-store memory. An explanation of other constituent elements is omitted.

In FIG. 10A, as data processing (I/O processing) during normal work, upon receiving an I/O from a compute node 920, the I/O process 933A of the storage node 930A carries out I/O processing (step S901 which appears as 'data I/O' in FIG. 10A). During the data processing, the information (one of the configuration information items) required for the I/O processing is saved in the all-node common area (the SODB 935A, for example) (step S902). Furthermore, the data which has been saved in the SODB 935A is synchronized between nodes with optional timing and, in this example, the same data as the SODB 935A is also saved in the SODB 935B (step S903).

In FIG. 10B, the storage node 930A falls into a stopped or non-working state due to failure and, as a result of failover, the I/O processing carried out by the storage node 930A is inherited by the storage node 930B. Thereupon, the I/O process 934B of the storage node 930B is unaware of the I/O processing status in the storage node 930A and therefore accesses the SODB 935B once, confirms the I/O process status in storage node 930A, and if there is information required for I/O processing, acquires same (step S904). Thereafter, the I/O process 934B of the storage node 930B carries out the inherited I/O processing (step S905).

As described hereinabove, in the storage system 900 according to conventional technology, because configuration information is held globally (in a nonvolatile data store), during I/O or failover it is necessary to access the SODB 935A, 935B which have a low data access speed (steps S902 and S904 and so forth). Therefore, because the data access takes time, problems arise such as a drop in I/O performance or immediate failover not being possible.

Figure 11:
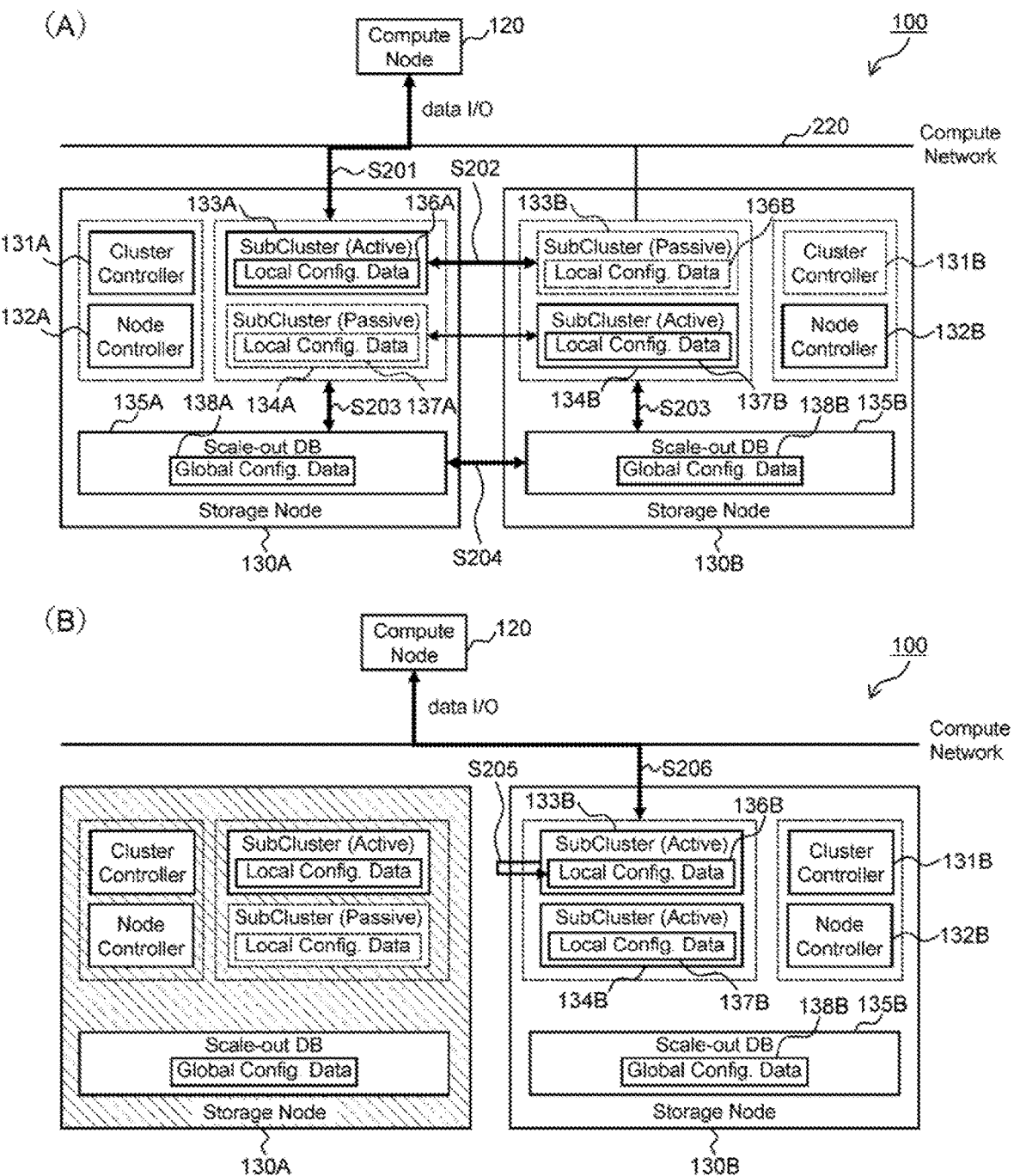
FIG. 11 is a diagram serving to explain the operation of I/O processing according to the embodiment.

The storage system 100 according to this embodiment will be explained next. FIG. 11 is a diagram serving to explain the I/O processing operation according to the embodiment. FIG. 11A is a diagram explaining the operation during normal work and FIG. 11B is a diagram explaining the operation at the time of failover. FIGS. 11A and 11B show a configuration relating to I/O processing among the configurations of the storage system 100 shown in FIG. 1. An explanation of each of the constituent elements is omitted.

In FIG. 11A, as data processing (I/O processing) during normal work, upon receiving an I/O from a compute node 120, the active subcluster 133A of the storage node 130A carries out I/O processing (step S201 which appears as 'data I/O' in FIG. 11A). During the data processing, the information required for the I/O processing is updated as local configuration information 136A and synchronized with the local configuration information 136B of the passive subcluster 133B which is present as a standby-type subcluster in the storage node 130B (step S202). As mentioned hereinabove, each local configuration information item is stored in a local memory (in-memory) which has a high data access speed.

Note that FIG. 11A shows a data transfer being performed between local configuration information (local configuration information 136A of subcluster 133A, and the like) and global configuration information (global configuration information 138A of SODB 135A, and the like) (step S203). This is processing for maintaining consistency between the local configuration information and global configuration information and there are no particular limitations on the execution timing thereof. That is, in this embodiment, the subcluster 133A is able to advance the I/O processing regardless of the processing timing of step S203. Furthermore, the global configuration information 138 which has been saved in the SODB 135A is synchronized between nodes with optional timing and, in this example, the same global configuration information (global configuration information 138B) is saved in the SODB 135B (step S204).

In FIG. 11B, the storage node 130A falls into a stopped or non-working state due to failure and, as a result of failover, the I/O processing carried out by the storage node 130A is inherited by the storage node 130B. Thereupon, the subcluster 133B of the storage node 130B is switched from passive to active in place of the active subcluster 133A which carried out the I/O processing in the storage node 130A.

Here, as a result of the synchronization explained in earlier step S202, I/O-related information which has been processed by the subcluster 133A in the storage node 130A is held in the local configuration information 136B which is held by the subcluster 133B. Therefore, the subcluster 133B which has been switched to active is able to continuously carry out the I/O processing immediately by referring (S205) to its own held local configuration information 136B (step S206).

As described hereinabove, with the storage system 100 according to this embodiment, configuration information which is required for I/O is held locally (in-memory) as local configuration information, and because the local configuration information is synchronized between nodes, during I/O or failover, the processing can be advanced only by accessing local memory (in-memory) which has a high data access speed without accessing the SODB 138A, 138B which have low data access speeds. Therefore, because the time required for data access can be shortened in comparison with the conventional technology, I/O performance can be improved and immediate failover can be implemented. In other words, the storage system 100 according to the embodiment is capable of providing high availability and implementing high-speed failover.

Note that the present invention is not limited to or by the foregoing embodiments and encompasses a variety of modification examples. For example, the foregoing embodiment has been explained in detail in order to provide an explanation that facilitates understanding of the present invention, but the present invention is not necessarily limited to an embodiment that comprises all the configurations thus explained. Moreover, other configurations can be added, removed or replaced for some of the configurations of the embodiment.

Furthermore, each of the configurations and functions and so forth illustrated by this embodiment may also be implemented by software as a result of a processor interpreting and executing a program which implements the respective functions. The information of the programs, tables, files and the like representing each of the functions can be placed on recording apparatuses such as memory, hard disks and SSD (Solid State Drives), or on recording media such as IC cards, SD cards and DVDs.

Moreover, control lines and information lines and the like as deemed necessary for an explanation are shown in each of the drawings but not all the control lines and information lines in a product are necessarily shown. In reality, almost all the configurations may be regarded as being coupled to one another.

REFERENCE SIGNS LIST

10: physical server
20: hardware
21: CPU
22: memory (in-memory)
23: various physical ports
24: physical disk (SSD)
25: physical disk (HHD)
30: middleware/software
31: SDS OS
32: OSS
33: virtual machine
34: Hypervisor
35: Linux kernel
100: storage system
110: controller node
111: administrator
120: compute node
130 (130A, 130B): storage node
131 (131A, 131B): cluster controller
132 (132A, 132B): node controller
133 (133A, 133B): subcluster
134 (134A, 134B): subcluster
135 (135A, 135B): scale-out database (SODB: Scale-out DB)
136 (136A, 136B): local configuration information (Local Config. Data)
137 (137A, 137B): local configuration information (Local Config. Data)
138 (138A, 138B): global configuration information (Global Config. Data)
210: management network
220: compute network

The invention claimed is:

1. A scale-out-type storage system in which a cluster is constructed by linking a plurality of nodes, at least two or more nodes among the plurality of nodes each comprising:
a cluster controller which controls processing spanning the whole cluster;
a node controller which performs closed processing control on its own node;
a plurality of subcluster processes which are processes which execute I/O processing in their own node, which form a subcluster between processes in their own node, and which are synchronized with work-type/standby-type corresponding processes in the other nodes; and
a nonvolatile data store which is shared by the whole cluster,
wherein the data store holds, as global configuration information, configuration information which includes information that must be shared by the whole cluster among the configuration information of the storage system,
wherein the subcluster processes hold, as local configuration information, configuration information which is required for their own subcluster process to operate among the configuration information of the storage system, and
wherein a work-type subcluster process is capable of executing the I/O processing without accessing the data store,
wherein the cluster controller is configured to:
receive an update request,
update a portion of the global configuration information based on the update request,
acquire an identifier for the portion of the global configuration information that is updated and acquire data based on the identifier,
specify a subcluster identifier based on the acquired data and acquire a subcluster, the acquired subcluster having the same subcluster identifier as the subcluster which is specified,
specify a node based on the acquired subcluster, the specified node is where the acquired subcluster is stored,
send a local configuration information update request to the node controller, such that the node controller updates the local configuration information corresponding to the update request.

2. The storage system according to claim 1,
wherein a standby-type subcluster process which corresponds to the subcluster process in one of the other nodes is switched to a working-type when the node which comprises the working-type subcluster process which is executing the I/O processing has entered a stopped or non-working state, and
wherein the subcluster process which has been switched to the working-type inherits the execution of the I/O processing by using the local configuration information.

3. The storage system according to claim 1,
wherein, when the global configuration information is updated, specific local configuration information which includes information corresponding to the update request among a plurality of the local configuration information is updated in response to the update to the global configuration information.

4. The storage system according to claim 3,
wherein the global configuration information contains control information which makes it possible to identify whether each of the plurality of subcluster processes is of a working type or a standby type,
wherein, when the update request to the global configuration information has been requested, the cluster controller updates the global configuration information and specifies the work-type subcluster process holding the specific local configuration information based on the control information, and
wherein the node controller of the node, which comprises the work-type subcluster process that is specified, updates the specific local configuration information by means of the global configuration information update request.

5. A configuration information control method of controlling configuration information of a scale-out-type storage system in which a cluster is constructed by linking a plurality of nodes, at least two or more nodes among the plurality of nodes in the storage system each comprising:
   a cluster controller which controls processing spanning the whole cluster;
   a node controller which performs closed processing control on its own node;
   a plurality of subcluster processes which are processes which execute I/O processing in their own node, which form a subcluster between processes in their own node, and which are synchronized with work-type/standby-type corresponding processes in the other nodes; and
   a nonvolatile data store which is shared by the whole cluster,
      wherein the data store holds, as global configuration information, configuration information which includes information that must be shared by the whole cluster among the configuration information of the storage system,
      wherein the subcluster processes hold, as local configuration information, configuration information which is required for their own subcluster process to operate among the configuration information of the storage system, and
      wherein the work-type subcluster process is capable of executing the I/O processing without accessing the data store,
   the cluster controller is configured to:
      receive an update request,
      update a portion of the global configuration information based on the update request,
      acquire an identifier for the portion of the global configuration information that is updated and acquire data based on the identifier,
      specify a subcluster identifier based on the acquired data and acquire a subcluster, the acquired subcluster having the same subcluster identifier as the subcluster which is specified,
      specify a node based on the acquired subcluster, the specified node is where the acquired subcluster is stored,
      send a local configuration information update request to the node controller, such that the node controller updates the local configuration information corresponding to the update request.

6. The configuration information control method according to claim 5, comprising:
   switching the standby-type subcluster process which corresponds to the subcluster process in one of the other nodes to a working-type when the node which comprises the work-type subcluster process which is executing the I/O processing has entered a stopped or non-working state, and
   causing the subcluster process which has been switched to the working-type in the switching step to inherits the execution of the I/O processing by using the local configuration information.

7. The configuration information control method according to claim 5,
   wherein, when the global configuration information is updated, specific local configuration information which includes information corresponding to the request among a plurality of the local configuration information is updated in response to the update to the global configuration information.

8. The configuration information control method according to claim 7, wherein the method comprises:
   the global configuration information containing control information which makes it possible to identify whether each of the plurality of subcluster processes is of a working type or a standby type, the configuration information control method further comprising:
   updating, via the cluster controller, the global configuration information when the update request has been requested;
   specifying, via the cluster controller, the work-type subcluster process holding the specific local configuration information based on the control information; and
   updating the node controller of the node, which comprises the work-type subcluster process that is specified, to the specific local configuration information by means of the global configuration information update request.

* * * * *